United States Patent [19]
Lipa et al.

[11] Patent Number: 6,061,722
[45] Date of Patent: May 9, 2000

[54] ASSESSING NETWORK PERFORMANCE WITHOUT INTERFERENCE WITH NORMAL NETWORK OPERATIONS

[75] Inventors: William J. Lipa, Foster City; Howard L. Berkey, San Mateo; Derrick L. Pendleton, Walnut Creek, all of Calif.

[73] Assignee: T E Network, Inc., San Francisco, Calif.

[21] Appl. No.: 08/771,848

[22] Filed: Dec. 23, 1996

[51] Int. Cl.$^7$ .................................................. G06F 15/173
[52] U.S. Cl. .......................... 709/224; 709/203; 709/223; 709/228; 709/237; 709/238; 707/2; 707/10
[58] Field of Search ........................ 395/200.32, 200.35, 395/200.53, 200.59, 200.67; 463/41–43; 709/202–205, 223–229, 231–238; 707/2, 4, 5, 10, 102, 104, 200, 205–206; 705/8, 10, 27; 340/825

[56] References Cited

U.S. PATENT DOCUMENTS

| | | | |
|---|---|---|---|
| 5,459,455 | 10/1995 | Sato | 370/410 |
| 5,530,913 | 6/1996 | Scholefield | 455/450 |
| 5,542,119 | 7/1996 | Grube et al. | 455/503 |
| 5,596,318 | 1/1997 | Mitchell | 340/825.44 |
| 5,664,103 | 9/1997 | Stein et al. | 709/205 |
| 5,685,775 | 11/1997 | Bakoglu et al. | 463/41 |
| 5,701,465 | 12/1997 | Baugher et al. | 709/229 |
| 5,726,979 | 3/1998 | Henderson et al. | 370/254 |
| 5,727,002 | 3/1998 | Miller et al. | 709/237 |
| 5,774,656 | 6/1998 | Hattori et al. | 709/223 |
| 5,794,148 | 8/1998 | Mamaghani et al. | 455/435 |
| 5,815,668 | 9/1998 | Hashimoto | 709/238 |
| 5,822,543 | 10/1998 | Dunn et al. | 709/231 |
| 5,842,199 | 11/1998 | Miller et al. | 707/2 |

*Primary Examiner*—Zarni Maung
*Assistant Examiner*—Bharat Barot
*Attorney, Agent, or Firm*—Fenwick & West LLP

[57] ABSTRACT

A system and method of measuring network performance and determining hardware characteristics without interference with normal network operations. Several indicators of computer and network performance are measured in order to determine whether a user's network communication is sufficient for desired operations, and in order to guide the user to the best zone or server for optimal performance. The system and method take into account factors such as latency; bandwidth; CPU performance; memory size of the client computer; and presence of other background or concurrent processes on the client computer. Where applicable, performance tests are repeated over a period of time in order to better estimate the trends and to better predict changes in performance characteristics over time.

29 Claims, 8 Drawing Sheets

ASSESSING NETWORK PERFORMANCE WITHOUT INTERFERENCE WITH NORMAL NETWORK OPERATIONS

BACKGROUND OF THE INVENTION

1. Field of the Invention

This invention relates to computer network performance assessment and, more particularly, to a system and method of automated measurement of computer and network performance characteristics concurrent with and not interfering with normal network operations.

2. Description of the Related Art

Network performance assessment is a valuable element in successful operation of time-critical applications running in a networked environment. Performance assessment is of particular importance when the operation of each node is dependent on timely receipt of information packets from other nodes. This situation often occurs, for example, in multiplayer games played over a network connection or a connectionless communication. Such games often require input from a number of players before the sequence of events simulated by the game may continue. For example, one player may attempt to shoot a second player by aiming a gun at him and firing. If the second player moves out of the way, he may avoid getting shot. Therefore, the game environment must receive information from both players, including the location targeted by the first player, as well as the particulars of the second player's movement, before it can be determined whether the second player is hit by the shot. Undue delay in receiving one or both of these pieces of information may diminish the entertainment value of the product by causing the entire game to slow down while waiting for information. Other players may in turn be affected by the delay. Thus, a single substandard connection may be detrimental to the enjoyment of the multiplayer game for some or all of the players involved. In some cases, excessive delay in communications with one or more nodes may cause the application to crash.

Currently known techniques for network performance are limited to obtrusive methods which interfere with normal network operations. For example, one conventional technique includes sending a ping packet from one network node to another, measuring the elapsed time before a response is received, and calculating an estimated network latency metric based on the perceived response time. This latency measurement technique conventionally requires that no other network communications occur among the nodes being tested. Therefore the performance assessment conventionally requires an interruption in user activity. In addition, such measurement may be inherently inaccurate, since it provides an indication of latency only for the particular moment during which the test is performed, without allowing for changes in latency over time.

Finally, the conventional technique does not take into account other network performance indicators and factors, such as bandwidth, CPU performance, minimum hardware requirements of nodes, and the presence of background or concurrent processes that may affect network performance.

Accordingly, it is desirable to accurately and unobtrusively measure network performance for each player in order to determine whether the player's computer hardware and network connection meet minimum requirements to assure an enjoyable gaming experience for all players. Such performance measurements are also useful in non-game environments in which time-critical information is needed from particular elements of the network. It is preferable to measure several different network performance metrics and to perform such measurements without affecting normal network operations. Finally, it is desired to measure network performance over a period of time so that trends and changes in conditions can be observed and predicted.

SUMMARY OF THE INVENTION

In accordance with the present invention, there is provided a system and method of measuring network performance and determining hardware characteristics without interference with normal network operations. Several indicators of computer and network performance may be measured for a particular node or connection, including for example: average latency; standard deviation in latency; bandwidth; packet loss; CPU performance; memory size of the client computer; and presence of other background or concurrent processes on the client computer. Where applicable, performance tests are repeated over a period of time in order to better estimate the trends and to better predict changes in performance characteristics over time.

The present invention performs four functions relating to network performance assessment, including: 1) ensuring that minimum hardware requirements are met; 2) assessing the effect on performance that may result from background or concurrent processes running on the user's machine; 3) assisting the user in selecting a zone (a group of servers) for most desirable performance characteristics; and 4) after entry into a zone, verifying that the user's connection has acceptable communications characteristics.

The present invention determines whether minimum hardware requirements are met by passing a parameter list to the client software and running handler functions for querying the client hardware as to various hardware characteristics. If hardware requirements are not met, the user is informed of the problem.

The present invention determines whether any background or concurrent processes are running on the user's machine and compares each process with a list of non-acceptable processes. Certain types of processes, such as 16-bit processes, are considered non-acceptable by default, unless included in a separate list if acceptable 16-bit processes. If any of the running processes are not acceptable, the user is presented with a message to inform him or her of the problem. The user may optionally elect to terminate the non-acceptable processes.

The present invention determines which of a plurality of zones is likely to provide the best connection for the user by performing a number of ping operations to each zone to determine relative latency of each connection. Each zone contains one or more servers, each server running one or more arenas which form game-matching area where users go to meet other players and arrange games. Bandwidth is assessed for the best zone. Based on these results, zone ratings are presented to the user to facilitate selection of one of the zones.

After a user has connected to a zone, the present invention performs a more rigorous performance assessment in order to determine actual performance of the network connection over a period of time. Performance is classified quantitatively based on the results of the assessment. Based on the classification, the user may be advised not to enter particular game arenas, or may be locked out of certain arenas, or may be given suggestions on how to improve the connection.

DESCRIPTION OF THE PREFERRED EMBODIMENT

The following description refers to the present invention as operating in the context of a multi-player videogame environment. Thus, for illustrative purposes, the description employs terms applicable to such an environment. As will be apparent to those skilled in the art, the techniques of the present invention can be applied to other types of environments employing network connections or connectionless communications, without departing from the spirit or essential characteristics of the present invention as recited in the claims.

Figure 1:
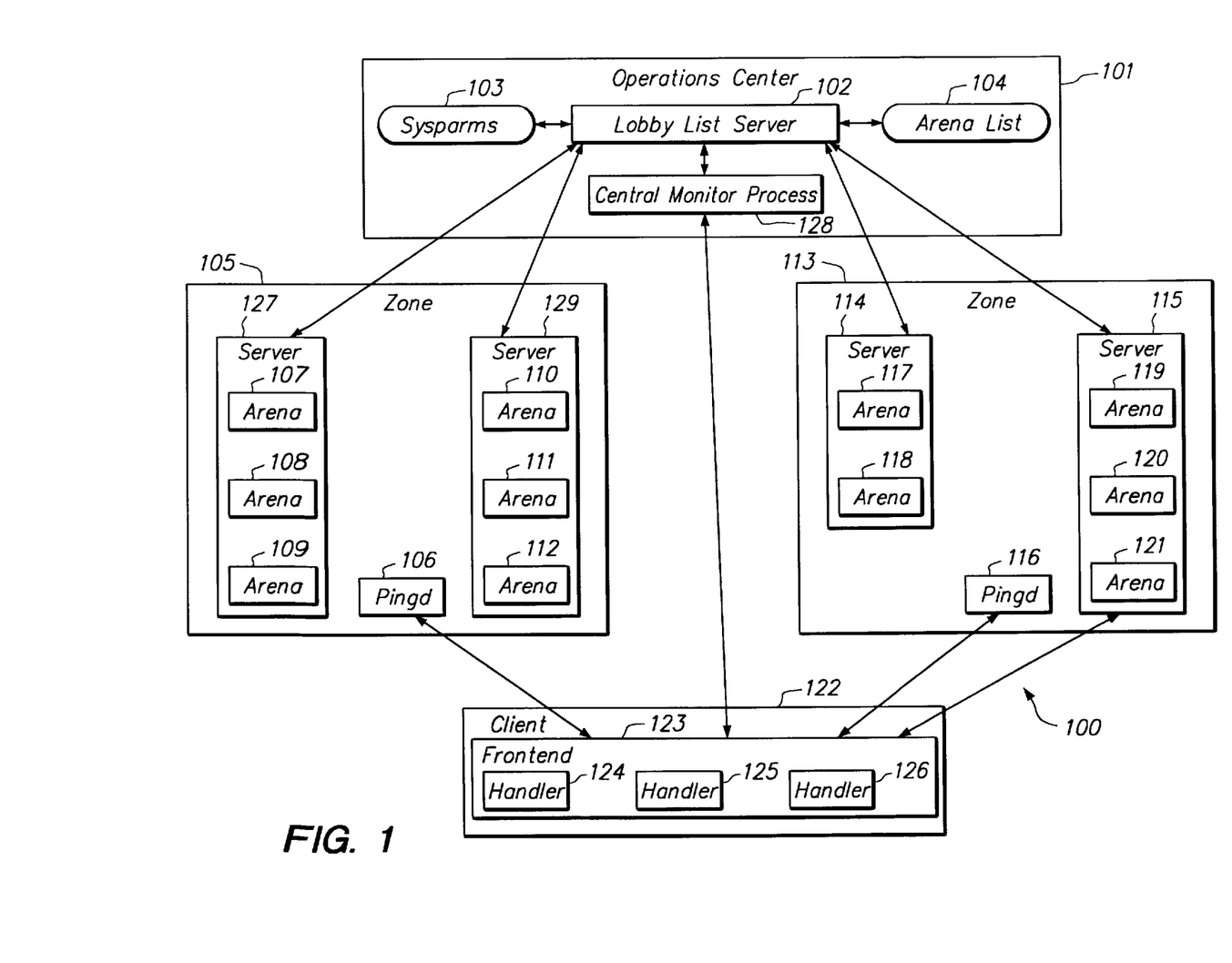
FIG. 1 is a block diagram of a network architecture for practicing the present invention.

Referring now to FIG. 1, there is shown a block diagram of a network architecture as may be employed in practicing the present invention. System 100 shown in FIG. 1 is a network of interconnected computers. In one embodiment of the present invention, client-server connections are implemented using standard analog telephone lines, and connections between operations center 101 and servers 129, 114, 115, 127 are implemented using T1 lines. Other types of connections such as ISDN lines, T3 lines, and the like, or connectionless communications schemes, may be employed. In one embodiment, standard network protocols such as Transmission Control Protocol/Internet Protocol (TCP/IP) are employed to implement communications along the connections. For illustrative purposes, FIG. 1 shows two zones 105, 113, four servers 129, 114, 115, 127, and one client 122. The present invention may be practiced with any number of these components.

Operations center 101 is a set of central computers for managing network operations. Servers 129, 114, 115, 127 are computers running software for providing game functionality and arena hosting as described below. Client 122 is a computer, typically located at the user's site, running software for communicating with servers 129, 114, 115, 127. In one embodiment, operations center 101 is a fault-tolerant network of Sun Microsystems® UltraSparc® servers running the Solaris® operating system, servers 129, 114, 115, 127 are a remotely-operated network of Sun Microsystems® UltraSparc® servers running the Solaris® operating system, and client 122 is a personal computer equipped with a Pentium® processor and running the Microsoft® Windows™ 95 operating system.

Operations center 101 runs a lobby list server 102 for maintaining communications with game servers 129, 114, 115, 127, for maintaining arena list 104 listing all arenas 107–112, 117–121 in system 100, and for controlling and communicating which game server 129, 114, 115, 127 hosts which arena 107–112, 117–121. In one embodiment, a plurality of lobby list servers 102 is provided, each lobby list server 102 for running a particular type of game. In another embodiment, multiple redundant lobby list servers 102 are provided for fault tolerance. Operations center 101 also consults and maintains a sysparm list 103 containing system requirements and specifications, as will be described in more detail below. Central monitor process 128 maintains a mapping of service names to network addresses, and is responsible for answering certain types of address queries from front-end 123 and servers 129, 114, 115, 127.

Each arena 107–112, 117–121 is a game-matching area where users go to meet other players and arrange games. In one embodiment, arenas 107–112, 117–121 have "chat" facilities permitting users to communicate with one another. Typically, arenas 107–112, 117–121 may contain approximately 30-50 users each. Arenas 107–112, 117–121 provide entry points for one or more games that may be concurrently operating on the associated server, or on other servers (not shown) under the administration of the associated server. Each arena may thus manage a number of games and present options for users to enter existing games, create new ones, and the like. Arenas 107–112, 117–121 are distributed among several servers. In the example of FIG. 1, arenas 107–109 are hosted by server 127, arenas 110–112 are hosted by server 129, arenas 117–118 are hosted by server 114, and arenas 119–121 are hosted by server 115. Lobby list server 102 tells servers 129, 114, 115, 127 which arenas to host.

In one embodiment, servers 129, 114, 115, 127 are organized in a plurality of zones 105, 113, typically differentiated by geographic location and/or by network connection type. In the example of FIG. 1, servers 129, 127 are located in zone 105, while servers 114, 115 are located in zone 113. Each zone 105, 113 contains a pingd 106, 116, a small daemon process that serves as an echo reflector. In one embodiment, pingd 106, 116 generally runs as a process on one of the servers in the associated zone. As will be described below, front-end 123 bounces ping packets off the pingd of each zone in order to determine which zone is best for a given user.

Each server 129, 114, 115, 127 maintains operations for the arenas it hosts and manages all the game data traffic for the games within those arenas. Each server 129, 114, 115, 127 maintains a connection to lobby list server 102 for the game type or types available on that server. In one embodiment, each server 129, 114, 115, 127 hosts only one type of game, though alternative embodiments may provide for multiple types of games to be hosted on a server.

When a user enters an arena, front-end 123 establishes a network connection to a server 129, 114, 115, 127 that hosts that arena. In the example of FIG. 1, such a connection has been established between front-end 123 and server 115. When a user enters a specific game within the arena, a second network connection is established to the same server. In one embodiment, different transactions are used on the two connections. For example, the first network connection may pass information about all games in the associated arena, while the second network connection may pass information specific to the selected game. In one embodiment, front-end 123 uses the first connection, and a separate game application (not shown) on client 122 uses the second connection.

Front-end 123 is client-side software that runs on the client machine 122 and provides a user interface to the user. In one embodiment, front-end 123 runs on a conventional personal computer such as, for example, a Pentium® processor-based machine running the Microsoft® Windows™ 95 operating system. Handlers 123–126 perform specific handling of system parameter information requests, as described in more detail below.

Figure 2:
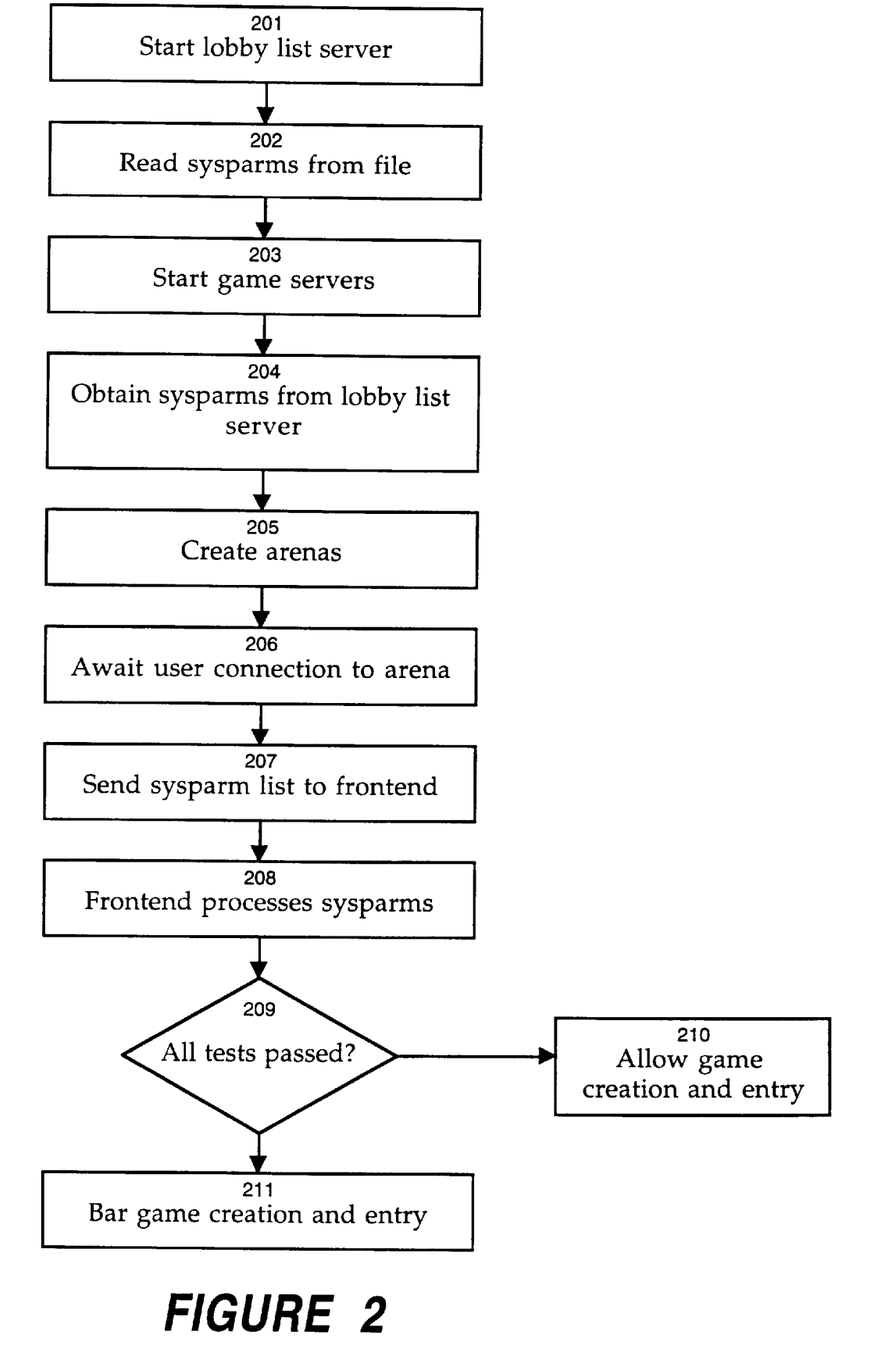
FIG. 2 is a flowchart of a network performance assessment method according to the present invention.

Referring now to FIG. 2, there is shown a flowchart of a network performance assessment method according to the present invention. By performing the steps of FIG. 2 as shown, system 100 determines whether the user's hardware meets the predetermined requirements for participating in game arenas and games.

First, in operations center 101, lobby list server 102 is started up 201. Lobby list server 102 reads 202 sysparm list 103, which is a file containing name-value pairs representing requirements. For example, one such pair might be "mem= 12", which would indicate a minimum memory requirement of 12 megabytes. Other system requirements may include, for example, processor speed, hard disk space, and software requirements such as required versions of software. For example, sysparm list 103 may specify that a particular version of a game is required in order to play with other users, so as to ensure compatibility in the communications among client machines. Lobby list server 102 loads sysparm list 103 into its RAM (not shown).

Servers 129, 114, 115, 127 are started up 203. Each server 129, 114, 115, 127 requests the address of lobby list server 102 for the appropriate game type from a central monitor process 128 in operations center 101 which is responsible for answering this type of address query from front-end 123 and servers 129, 114, 115, 127. Each server 129, 114, 115, 127 connects to appropriate lobby list server 102 and obtains 204 a copy of sysparm list 103. By maintaining sysparm list 103 at operations center 101 rather than at various servers 129, 114, 115, 127, maintenance of sysparm list 103 is facilitated. Changes to sysparm list 103 can be effected without requiring client software to be updated, and without requiring multiple redundant changes at the various servers 129, 114, 115, 127.

For illustrative purposes, focusing on server 115, lobby list server 102 transmits to server 115 a list of arenas 119, 120, 121 to be hosted by server 115. Server 115 creates 205, registers, and initializes arenas 119, 120, 121. The address of server 115 and the names of arenas 119, 120, 121 are registered on central monitor process 128.

Clients, e.g. 122, are now able to log into system 100, connect to server 115, and enter arenas 119, 120, 121. Server 115 awaits 206 client 122 connection to arenas 119, 120, 121. When client 122 enters one of arenas 119, 120, 121, server 115 sends 207 a copy of sysparm list 103 to front-end 123 of client 122, in one of the initial packets that are exchanged over the connection.

Front-end 123 processes 208 sysparm list 103 by examining each namevalue pair. For each pair, front-end 123 examines the name. If it recognizes the name, it passes the value to a handler function, e.g. 124, 125, 126, for that name. Each handler function 124 contains software for evaluating the parameter specified by one of the names in sysparm list 103. For example, a "mem" handler might be provided to determine the amount of random-access memory on the client 122 machine. Thus, upon examining the line "mem= 12" in sysparm list 103, front-end 123 would pass value "12" to the "mem" handler. "Mem" handler would then determine whether the client machine has 12 megabytes, in which case the test succeeds. If no handler exists for a name in sysparm list 103, front-end 123 ignores that name-value pair.

If all tests are passed 209, front-end 123 displays a message to the user and sets a flag that allows the user to create or join games 210 in the selected arena, e.g. 121. In one embodiment, such entry is subject to additional network performance tests. If one or more tests are not passed, front-end 123 displays an error message explaining the problem and bars entry 211 into any games in the selected arena. In one embodiment, the user may enter the selected arena even when one or more tests are not passed, but may not play games there. Chat operations, and certain other types of operations, may be permitted.

In one embodiment, sysparm list 103 is version-labeled, and a local copy is maintained in a cache in client machine 122. Instead of sending sysparm list 103 to front-end 123 in step 207, server 115 sends the version number of the current sysparm list 103. Front-end 123 checks its cache to determine whether it has the correct version. If so, it applies the local copy. If front-end 123 does not have the correct version, it requests it from server 115. Upon receipt of sysparm list 103 from server 115, front-end 123 inserts it in its local cache.

Some background applications and processes can have a deleterious effect on the quality of network connections. For example, when running the Windows 95™ operating system from Microsoft® Corporation, many 16-bit processes that were designed for Windows™ 3.1 and DOS may have such negative effects. In addition, some 32-bit processes may cause similar problems. In one embodiment of the present invention, the presence of such deleterious applications and processes is detected using the above-described scheme. A handler is included in front-end 123 to detect such applications and processes, as follows.

Two handlers are included in front-end 123, named "goodapp" and "badapp". In sysparm list 103, the names "goodapp" and "badapp" are included. Multiple values can be defined for each sysparm, with each value representing the name of a target process. When front-end 123 receives sysparm list 103, it accumulates an internal list of "goodapp" and "badapp" processes as specified in the list. "Goodapp" and "badapp" handlers then check each running process against the internal list. If a process is listed as a "badapp", it is rejected. If a process is a 16-bit process and not listed as a "goodapp", it is rejected. Thus, 16-bit processes are rejected by default, while 32-bit processes are accepted by default.

If any processes are rejected, front-end 123 presents a dialog box to the user, informing him or her that entry to the selected game is prohibited while the indicated process is running. In one embodiment, the user may choose to exit the game or have front-end 123 terminate the process by issuing a TerminateProcess call to the operating system.

Figure 3:
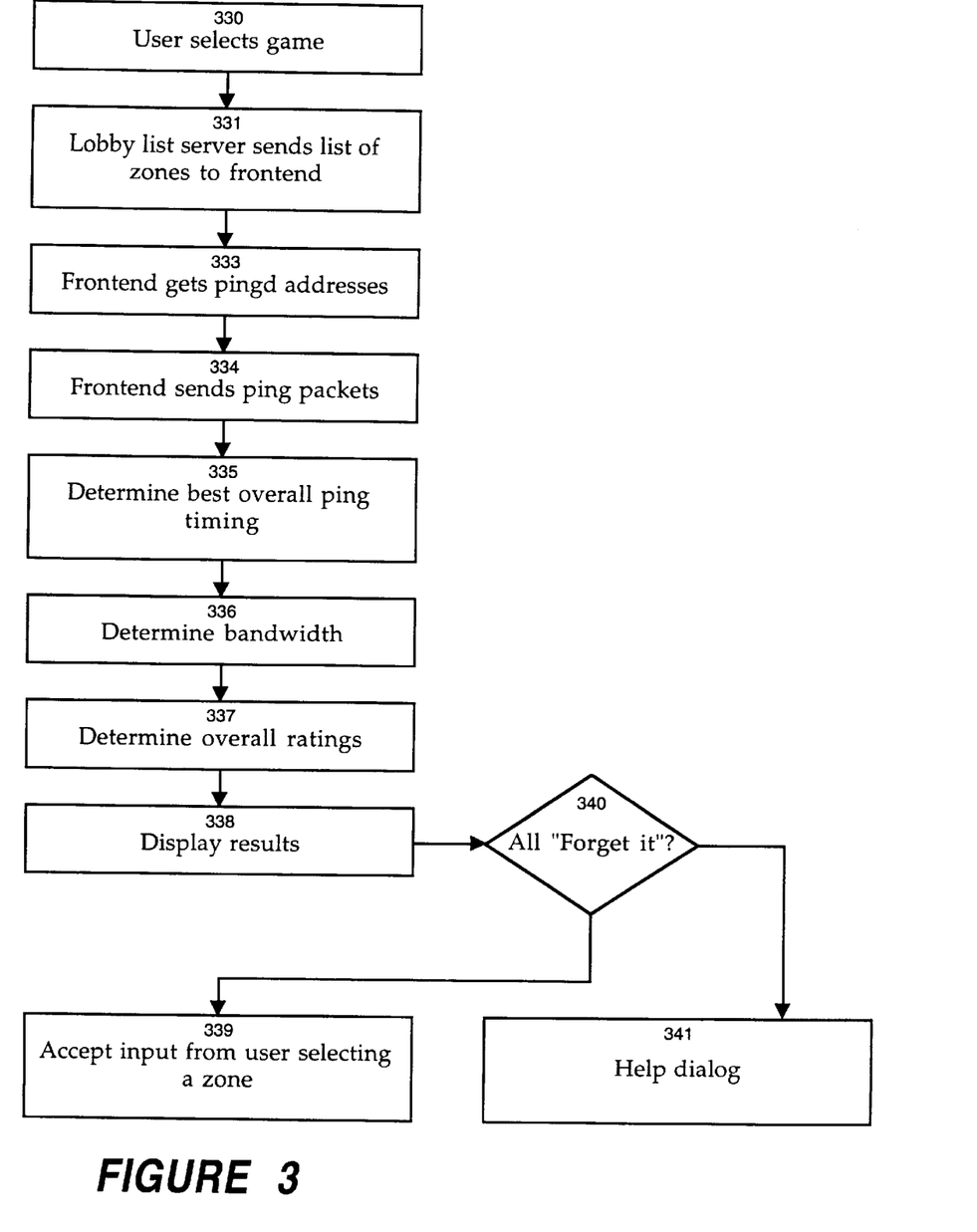
FIG. 3 is a flowchart of a zone evaluation and selection method according to the present invention.

Referring now to FIG. 3, there is shown a flowchart of a zone evaluation and selection method according to one embodiment of the present invention. Users connect to system 100 through, for example an Internet connection or by a proprietary network. In one embodiment, system 100 provides a plurality of zones 105, 113 to service various types of connections for various geographical areas. For example, one zone may be designated for proprietary network connections, another zone may be designated for west coast users, and a third zone may be designated for east coast users.

A user logs on to system 100 using his or her designated connection method. Front-end 123 presents a list of games for user selection. The user selects 330 one of the listed games. Front-end 123 connects to lobby list server 102 for the selected game type. Lobby list server 102 sends 331 a data packet containing a list of zones to front-end 123. Front-end 123 receives the list of zones, as well as zone rating information to be used for classifying the quality of network connections as will be described below. Front-end 123 gets 333 pingd addresses from central monitor process 128.

To measure latency, front-end 123 sends 334 a plurality of packets to each pingd 106, 116. In one embodiment, the size of the packets is fixed and the number of packets is a constant, such as for example ten packets of eight bytes each. In one embodiment each packet contains random data to be echoed. Front-end 123 records the time that it transmits each packet. When pingd 106, 116 receives a packet, it returns a copy to front-end 123. Front-end 123 measures the elapsed time for the packet roundtrip.

Front-end 123 determines 335 the overall ping timing by taking the average and standard deviation of the roundtrip times for the plurality of packets. This overall ping timing is then compared with overall ping timing for other zones. The best zone in terms of latency is determined by a performance metric that reflects this comparison. For example, in one embodiment, the best zone is selected by determining the zone having the minimum value of (average roundtrip time+2*standard deviation).

Front-end 123 determines 336 the bandwidth of the user's connection by sending several large packets to pingd 106, 116 in the best zone. Approximate bandwidth is determined by dividing the size of the packets by the total time to send and receive them. Since bandwidth is generally limited by the user's modem, it is not necessary to determine bandwidth for each zone. The bandwidth determination can be used to modify the evaluation of the network connection to the best zone. For example, in one embodiment, bandwidth determines the size of games the player may join. A linear equation maps bandwidth to a game size, measured in number of participants. If the result of the linear equation limits game size to less than two participants, all zones are rated "Forget It" and a dialog box is presented to inform the user of the situation. In another embodiment, bandwidth determines the size and number of separate streams of data front-end 123 can handle before network performance becomes unduly degraded.

Front-end 123 determines 337 overall ratings for each zone, based on the determined overall ping timing, bandwidth, and zone rating information previously obtained. Front-end 123 displays 338 the results to the user, providing zone ratings for each zone, such as for example "Excellent", "Good", "OK", or "Forget It". Thresholds for classification according to these ratings can vary from game to game and are sent as boundary numbers. For example, if the latency figure for "Excellent" is 100 msec, then a zone is classified as "Excellent" if the overall latency metric, determined above as (average round trip time+2*standard deviation), is less than or equal to 100 msec. Front-end 123 presents the best zone as the default choice.

In one embodiment, front-end 123 does not allow access to zones rated "Forget It". If all of the zones are rated "Forget It" 340, front-end 123 presents 341 a dialog box giving the user various options such as, for example, Customer Support Help, Reconnect Options, and the like. In one embodiment, the user may enter zones rated "Forget It" but may not play games there. Chat operations, and certain other types of operations, may be permitted.

If at least one of the zones is not rated "Forget It", the user may provide input 339 selecting a zone other than the default "best" zone. Front-end 123 then initiates contact to enter the selected zone.

By providing zones as described above, the system of the present invention groups users according to their connection types and geographic areas. Once a user enters a zone that has an acceptable connection rating for that user, he or she can enter arenas and initiate or join games with other users in the zone that have acceptable connection ratings. This decreases the likelihood that one user's slow connection will adversely affect other players in the same game.

Figure 4:
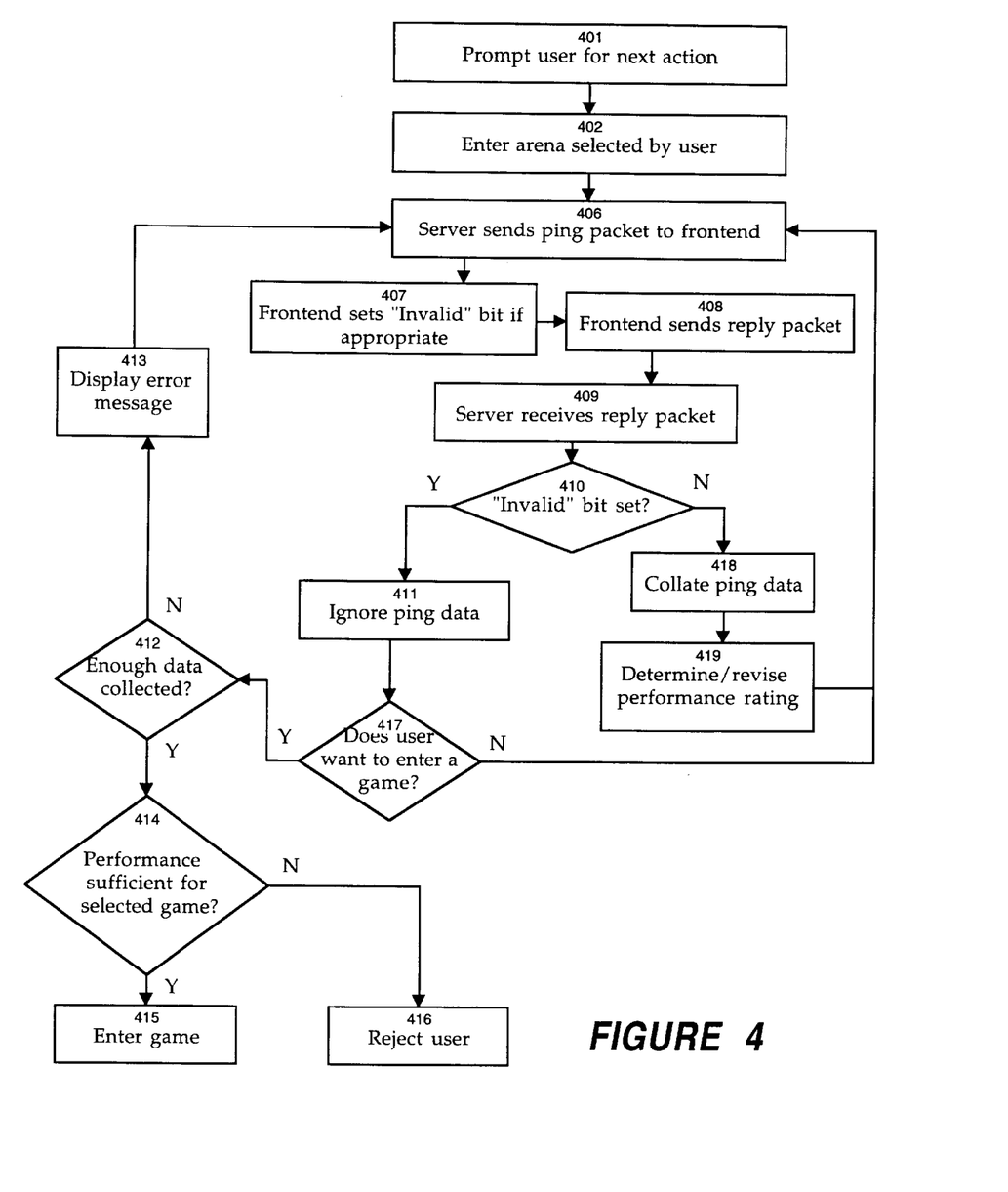
FIG. 4 is a flowchart of a method of assessing connection quality in an arena according to the present invention.

Referring now to FIG. 4, there is shown a flowchart of a method of assessing connection quality in an arena. Front-end 123 prompts 401 the user to enter an arena within the selected zone, and enters 402 the selected arena by initiating a connection between front-end 123 and the server 115 containing the selected arena, e.g. 121. In one embodiment, once the user is in the selected arena, additional network performance assessment is performed to obtain a more accurate measurement of the quality of the user's connection to the specific arena, with respect to the particular requirements of that arena. During the additional assessment period, which may last a predetermined amount of time, for example thirty seconds to one minute, the user is able to perform chat operations, observe latency information, player rankings, and the like. An icon may flash on the user's screen to inform him or her that the connection is being tested. The connection assessment measurements are filtered so that any events or actions that would degrade the accuracy of the data are removed or compensated for. The result is a long enough series of data points to make an accurate determination of play quality.

The additional assessment is in one embodiment initiated by the server 115 running the selected arena 121. Server 115 sends ping packets to front-end 123 using the method shown in FIG. 4. Server-initiated packets and server-calculated ratings are used in one embodiment, so that changes to the pinging method can be implemented by modifying server software without necessitating distribution of updated software to clients. Also, server-initiated packets are less subject to malicious activity or "hacking". The server is aware of the impending transmission of large data packets that might interfere with performance assessment, and can avoid sending ping packets just before such transmission occurs. Finally, server-initiated packets provide greater control of performance assessment operations, and greater access to information about other users.

Server 115 sends 406 a ping packet to front-end 123. The ping packet contains the following information:

command identifier labeling the packet as a ping packet;

flags field;

count value; and last valid sample that was processed.

The last valid sample is appended to the end of a circular buffer of latency measurements which is used to display a latency graph to the user in the front-end 123, as will be described below. The count value specifies the number of valid pings that remain to be processed before the user is allowed into a game, and is decremented whenever a valid ping is returned.

After sending the ping packet, server 115 schedules a new ping packet to be sent after a fixed interval of time. In one embodiment, pings are sent at a higher rate when the user first enters the arena, so that user-perceived delay is reduced.

Upon receiving the ping packet, front-end 123 sets 407 an "invalid" bit if appropriate. The invalid bit indicates that the reply packet should be ignored, because some activity or process interfered with the response. In this way, the system of the present invention provides a mechanism for permitting network operations to continue while performance assessment takes place, by simply ignoring those ping packets that are unduly affected by the network operations. Front-end 123 sets the invalid bit if: 1) front-end 123 is in "ignore" mode; or 2) front-end 123 was unable to get access to the CPU in the client 122 machine for more than a predetermined amount of time. In one embodiment, the predetermined amount of time is 50 ms, although any other time period may be used. "Ignore" mode is used when the user does something that is likely to invalidate a series of ping packets, such as for example activating a browser and browsing the World Wide Web. In one embodiment, if front-end 123 was able to get access to the CPU, but there was a delay of less than the predetermined amount of time, the amount of the delay is calculated and encoded in the reply packet.

Front-end 123 sends 408 the reply packet to server 115. When server 115 receives 409 the packet, it checks 410 whether the "invalid" bit was set.

If so, server 115 ignores 411 the ping data. In one embodiment, the reply packet may contain data describing how busy front-end 123 was when the reply packet was sent, and server 115 ignores ping data if this indicator exceeds a predetermined threshold value. In this way, threshold values and other parameters may be adjusted at server 115 side, so that the operation of the system may be configured without any changes to client hardware or software.

If the "invalid" bit was not set, and there is no other reason to ignore the ping data, server 115 collates 418 the ping data and determines or revises 419 the performance rating for the connection based on the ping data. Server 115 then returns to 406 to send another ping packet to front-end 123 in order to accumulate more ping data. After a predetermined number of ping packets have been processed, server 115 increases the delay times between successive pings in order to reduce network load and server load caused by the pinging.

Server 115 determines 417 if the user indicated that he or she wishes to enter a game, which may be a new game or one already in progress. If not, server 115 proceeds to 406 If the user indicates in 417 that he or she wants to enter a game, server 115 determines 412 whether enough ping data has been collected for a relatively accurate performance assessment. If not, server 115 does not allow the user to enter the game, front-end 123 displays 413 an error message instructing the user to wait, and server 115 returns to 406 to send another ping packet to front-end 123 in order to accumulate more ping data.

If in 412 server 115 determines that enough ping data has been collected, server 115 determines 414 whether the performance assessment indicates sufficient connection quality for the user-selected game. If so, server 115 allows the user to enter 415 the game, and play commences. If not, server 115 rejects 416 the user.

As ping data is collected, performance assessment ratings, including latency ratings, are determined at periodic intervals. In one embodiment of the present invention, four latency ratings are provided, such as "Excellent", "Good", "OK", or "Forget It". Any number of latency ratings may be employed. As described previously, the latency ratings are based on a number of categories. Thresholds for classification according to these ratings can vary from game to game. In addition, any latency "spikes" (points that have greater latency than some predetermined threshold value) are stored, so that the user's latency category can be classified as "Forget It" if the number of spikes exceeds a predetermined quantity.

Figure 5:
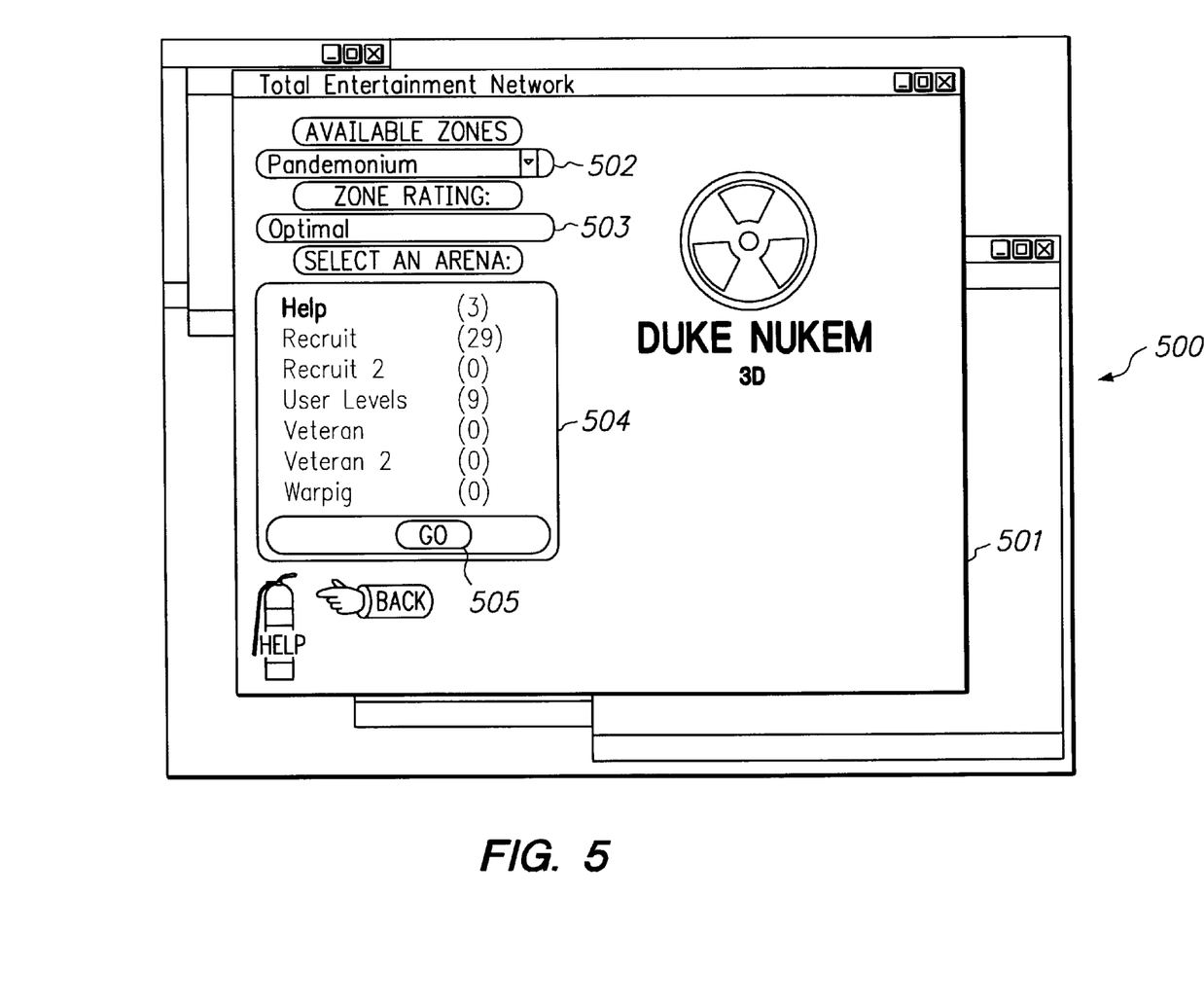
FIG. 5 is a screen shot of an arena selection screen according to the present invention.

Referring now to FIG. 5, there is shown a screen shot of an arena selection screen 500 according to one embodiment of the present invention. Window 501 contains the user interface for arena selection. Pop-up menu 502 shows the available zones, with the "best" zone shown as an initial default value. The user may select another zone by clicking on menu 502 and selecting from the pop-up menu choices that appear. Field 503 indicates the zone rating for the zone shown in menu 502. In the example of FIG. 5, "Pandemonium" zone is indicated in 502, and a zone rating of "optimal" is shown in field 503. List 504 shows the names of arenas that exist in the zone indicated in 502, and may be a scrolling list if desired. The user may select an arena for entry by clicking within list 504 and clicking on Go button 505.

Figure 6:
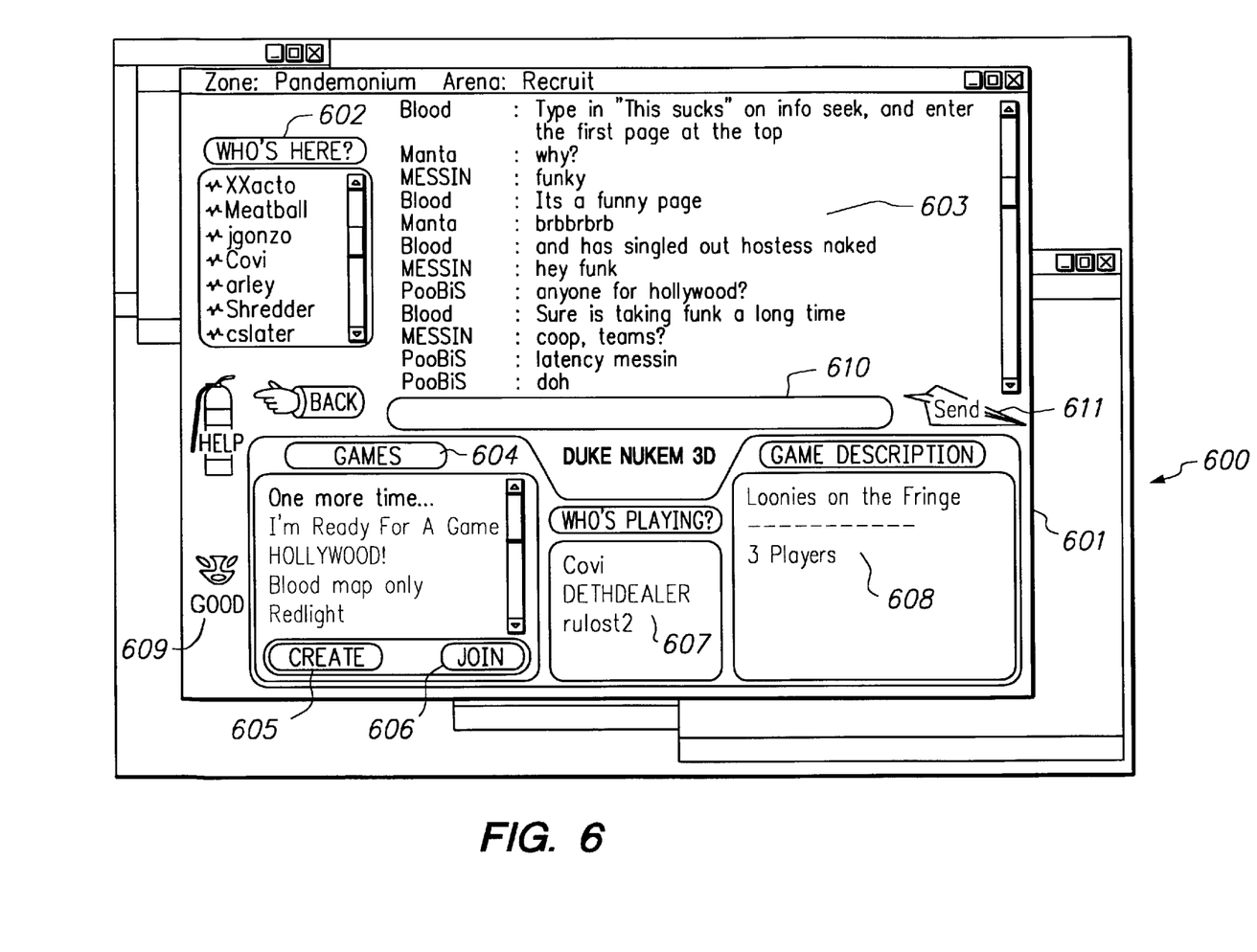
FIG. 6 is a screen shot of a game selection screen according to the present invention.

Referring now to FIG. 6, there is shown a screen shot of a game selection screen 600 according to one embodiment of the present invention. After the user has clicked on Go button 505 in screen 500, game selection screen 600 is presented. Window 601 contains the user interface for game selection. The zone and arena names are indicated in the title bar of window 601. Scrolling list 601 shows the names of other users currently in the arena. Chat box 603 displays a list of chat messages from users in the arena. Chat entry field 610 provides an area where the user may type a chat message to be submitted for display in chat box 603 on all user's machines within the arena. Send button 611 submits the chat message typed in chat entry field 610.

Scrolling list 604 shows the games currently taking place within the arena. When the user clicks on a game in list 604, additional information concerning the selected game is displayed. List 607 shows the names of users that are currently playing in the game, and field 608 provides a description of the game. The user may join the game by clicking on Join button 606. Alternatively, the user may create a new game by clicking on Create button 605. Joining or creating games is subject to the connection quality assessment described above in connection with FIG. 4.

Indicator 609 shows the connection assessment rating for the user in the current arena. In the example of FIG. 6, the rating is "Good", as indicated by a graphic and a text description.

Figure 7:
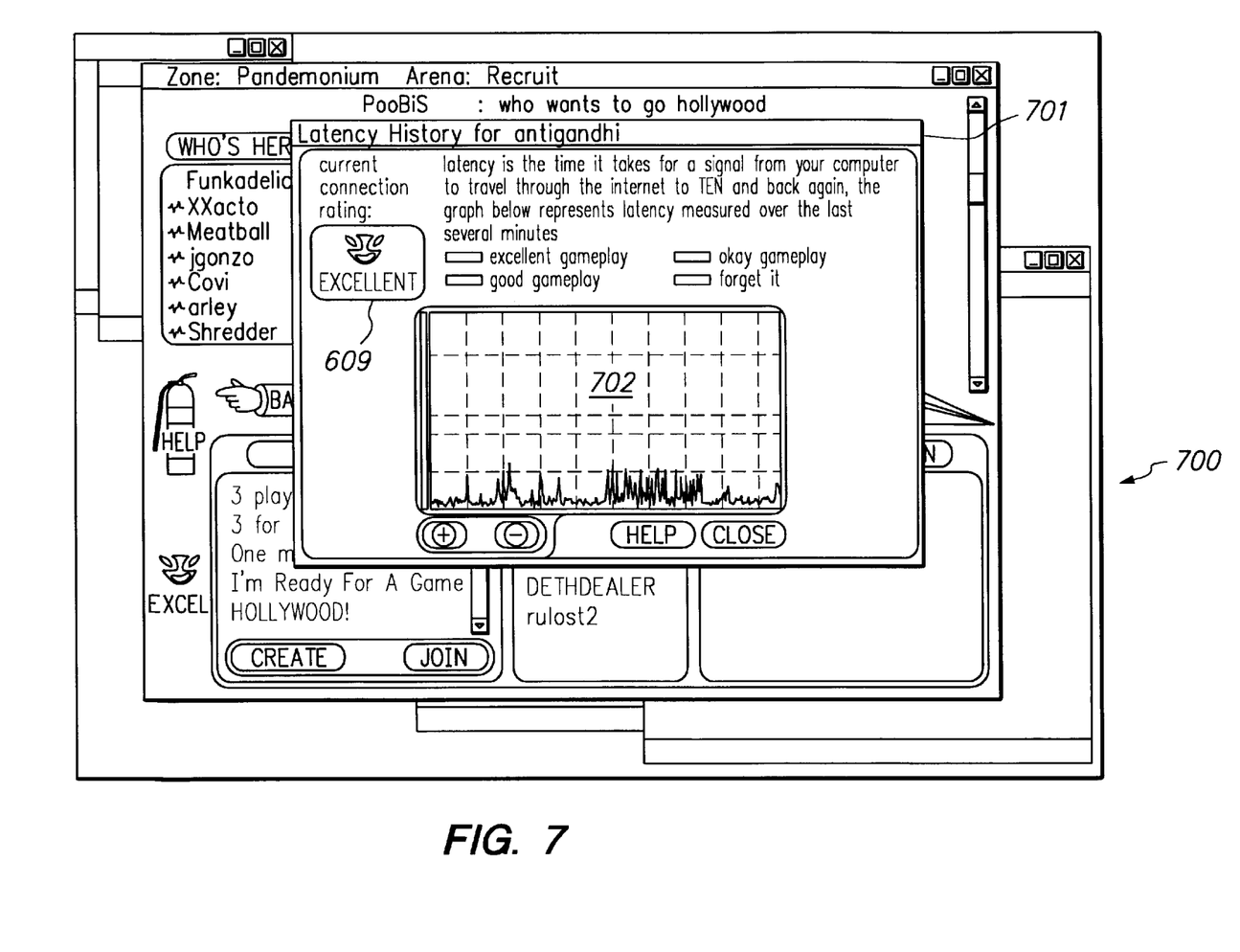
FIGS. 7 and 8 are screen shots of latency history graphs and ratings according to the present invention.

Referring now to FIG. 7, there is shown a sample latency history graph screen 700 according to one embodiment of the present invention. Window 701 contains the user interface for the latency history graph, and is accessed by right-clicking on a user in list 602 and selecting "Latency" from a pop-up menu that appears. The user may access window 701 for his or her own latency history graph by clicking on indicator 609 in window 601. Indicator 609 shows the connection assessment rating for the selected user. In the example of FIG. 7, the rating is "Excellent", as indicated by a graphic and a text description. Graph 702 shows a visual representation of the latency history over time.

Figure 8:
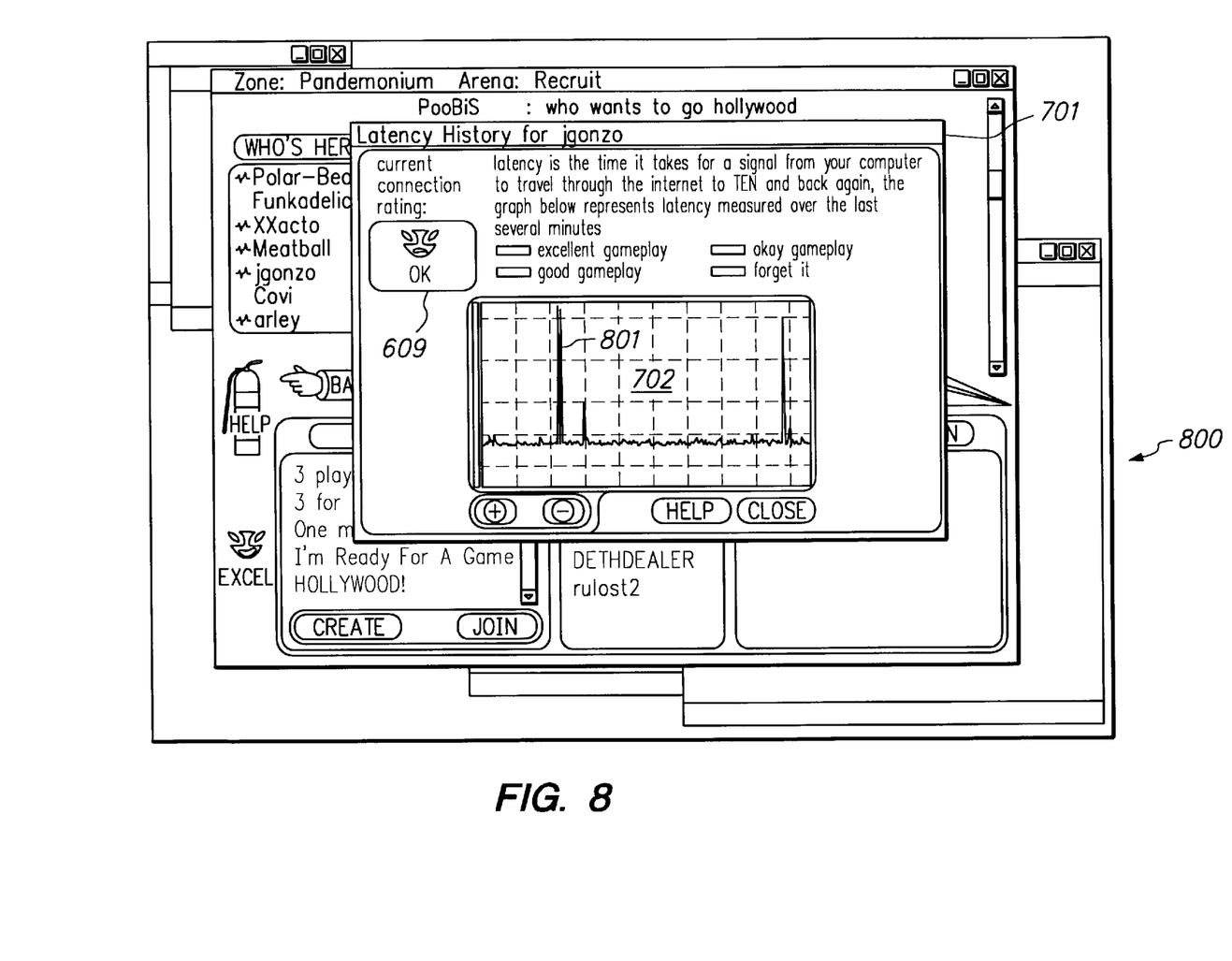

Referring now to FIG. 8, there is shown another sample latency history graph screen 800 according to one embodiment of the present invention. The example of FIG. 8 is similar to that of FIG. 7, but with a connection assessment of "OK" as shown by indicator 609. Graph 702 contains spikes 801 which indicate periods of increased latency that provide the rationale for the lower assessment rating.

Other performance metrics, such as for example bandwidth, may be displayed in a similar manner to that shown in FIGS. 7 and 8.

From the above description, it will be apparent that the invention disclosed herein provides a novel and advantageous network latency assessment system and method. The foregoing discussion discloses and describes merely exemplary methods and embodiments of the present invention. As will be understood by those familiar with the art, the invention may be embodied in other specific forms without departing from the spirit or essential characteristics thereof.

Accordingly, the disclosure of the present invention is intended to be illustrative, but not limiting, of the scope of the invention, which is set forth in the following claims.

What is claimed is:

1. A method of assessing performance of a network communication in a computer network, comprising:
   (a) determining a performance quality metric of a network communication between a client and a server, based on at least one of a comparison of a client hardware characteristic with a hardware requirement, and a comparison of a concurrent and independent process executing on the client with a list of prohibited or permitted processes; and
   (b) responsive to the determined performance quality metric being greater than a predetermined threshold, permitting network operations between the client and the server.

2. The method of claim 1, further comprising:
   (c) responsive to the determined performance quality metric being less than a predetermined threshold, terminating at least a subset of network operations between the client and the server.

3. The method of claim 1, further comprising:
   (c) responsive to the determined performance quality metric being less than a predetermined threshold, selectively terminating at least one concurrent process executing on the client in order to improve the performance quality metric.

4. The method of claim 1 wherein (a) comprises:
   (a.1) transmitting a parameter list to the client; and
   (a.2) determining client compliance with the parameter list.

5. The method of claim 4, wherein:
   (a.1) comprises transmitting a list of hardware requirements to the client; and
   (a.2) comprises determining client compliance with the list of hardware requirements.

6. The method of claim 4, wherein:
   (a.1) comprises transmitting a list of prohibited client-based processes to the client; and
   (a.2) comprises determining whether the client is running any of the listed prohibited client-based processes.

7. The method of claim 4, wherein:
   (a.1) comprises transmitting a list of permitted client-based processes to the client; and
   (a.2) comprises determining whether the client is running any client-based processes not on the transmitted list.

8. The method of claim 1, wherein (a) comprises:
   (a.1) transmitting a parameter list to at least one server;
   (a.2) accepting input from a client requesting communication with a selected server;
   (a.3) transmitting the parameter list to the client;
   (a.4) determining client compliance with the parameter list; and
   (a.5) responsive to the client complying with the parameter list, connecting the client to the selected server.

9. The method of claim 1, further comprising:
   (c) establishing at least two ranges of performance quality and then classifying network communication performance into one of the ranges based on the determined performance quality metric.

10. A method of assessing performance of a network communication in a computer network, comprising:
    (a) transmitting at least one ping packet across the network communication;
    (b) receiving at least one ping reply packet across the network communication;
    (c) determining, based on an indication of a hardware characteristic or a concurrent process affecting the ping packet or the ping reply packer, whether each ping reply packet should be accepted or ignored;
    (d) measuring a transmission time of each accepted ping reply packet; and
    (e) determining a latency measurement of the network communication from the measured transmission times of accepted ping reply packets.

11. The method of claim 10, further comprising:
    (f) responsive to the determined latency measurement being greater than a predetermined threshold, terminating at least a subset of network operations between the client and the server.

12. The method of claim 10, wherein (a) is performed concurrently with and independently of normal network operations using the network communication.

13. The method of claim 10, wherein (c) comprises:
    (c.1) reading a flag in each ping reply packet to determine whether the ping reply packer should be accepted or ignored.

14. A method of assessing performance of a network communication in a computer network, comprising:
    (a) transmitting a plurality of ping packets across the network communication;
    (b) receiving at least one ping reply packet across the network communication;
    (c) for at least one ping reply packet, determining a delay factor, the delay factor corresponding to an elapsed time between receipt of a ping packet at a node and transmission of a corresponding ping reply packet from the node;
    (d) determining, based on an indication of a hardware characteristic or a concurrent process affecting the ping packet or the ping reply packet, whether each ping reply packet should be accepted or ignored;
    (e) measuring a transmission time of at least one accepted ping reply packet;
    (f) adjusting the measured transmission time for the at least one accepted ping reply packet based on the determined delay factor; and
    (g) determining a latency measurement of the network communication from the adjusted measured transmission times of accepted ping reply packets.

15. A method of assessing network performance in a computer network including a client and a server, comprising:
    (a) transmitting a ping packer to the client;
    (b) receiving a ping reply packer from the client;
    (c) determining, based on an indication of a hardware characteristic or a concurrent process affecting the ping packet or the ping reply packet, whether the ping reply packet should be accepted or ignored;
    (d) responsive to the ping reply packet being accepted, measuring packet response time to determine a latency measurement;
    (e) repeating (a) through (d) until a predetermined number of packets have been processed;
    (f) responsive to the determined latency measurement indicating overall latency below a predetermined threshold, permitting further network operations between the client and the server; and (g) responsive to the determined latency measurement not indicating overall latency below a predetermined threshold, terminating at least a subset of further network operations between the client and the server.

16. A computer network performance assessment system, comprising:

at least one server for communication with a client over a computer network; and a communication assessment module coupled to the at least one server for determining a performance quality metric of a network communication between the at least one server and the client, based on at least one of a comparison of a client hardware characteristic with a hardware requirement and a comparison of a concurrent process executing on the client with a list of prohibited or permitted processes, and for, responsive to the determined performance quality metric being greater than a predetermined threshold, permitting network operations between the client and the server.

17. The system of claim 16, further comprising:

a list server coupled to the at least one server, for transmitting a parameter list to the at least one server;

and wherein the communication assessment module processes the parameter list to determine whether the client conforms to the parameter list.

18. The system of claim 17, wherein the parameter list comprises a list of hardware requirements.

19. The system of claim 17, wherein the parameter list comprises a list of prohibited client-based processes, and the communication assessment module determines whether the client is running any of the listed prohibited client-based processes.

20. The system of claim 17, wherein the parameter list comprises a list of permitted client-based processes, and the communication assessment module determines whether the client is running any client-based processes not on the transmitted list.

21. A computer network performance assessment system, comprising:

at least one server group, each server group containing at least one server, each server for receiving and transmitting a parameter list;

a list server coupled to the parameter list and to the at least one server, for reading a parameter list containing at least one hardware requirement and for transmitting the parameter list to the at least one server;

a client coupled to the at least one server by a network communication, for receiving the parameter list; and at least one handler coupled to the client, for processing the parameter list to determine whether at least one client hardware characteristic conforms to the at least one hardware requirement;

wherein the client selectively permits further network operations responsive to the results of the at least one handler.

22. The system of claim 21, wherein the parameter list further contains a list of prohibited client-based processes, the system further comprising:

at least one handler coupled to the client for determining whether the client is running any of the listed prohibited client-based processes.

23. The system of claim 21, wherein the parameter list further contains a list of permitted client-based processes, the system further comprising:

at least one handler coupled to the client for determining whether the client is running any client-based processes not on the list of permitted processes.

24. A computer network performance assessment system, comprising:

at least one server group, each server group comprising at least one server capable of communication with a client;

a communication assessment module coupled to the at least one server for determining a performance quality metric of a network communication between the client and at least one server in each server group, based on at least one of a comparison of a client hardware characteristic with a hardware requirement, and a comparison of a concurrent process executing on the client with a list of prohibited or permitted processes; and a zone selection module coupled to the communication assessment module for selecting a preferred server group responsive to the determined performance quality metrics.

25. The system of claim 24, wherein the communication assessment module comprises:

a ping reply device coupled to the server, for receiving at least one ping packet and transmitting at least one ping reply packet;

a ping reply receiver coupled to the client, for receiving each transmitted ping reply packet and measuring a transmission time for the ping reply packet; and a latency estimating module coupled to the ping reply receiver, for estimating latency of the network communication from the measured transmission time.

26. The system of claim 24, wherein the communication assessment module comprises:

a ping reply device coupled to the client, for receiving at least one ping packet and transmitting at least one ping reply packet;

a ping reply receiver coupled to the server, for receiving each transmitted ping reply packet and measuring a transmission time for the ping reply packet; and a latency estimating module coupled to the ping reply receiver, for estimating latency of the network communication from the measured transmission time.

27. A computer network performance assessment system, comprising:

at least one server capable of communication with a client over a network communication;

a ping transmitter for transmitting at least one ping packet across the network communication;

a ping receiver for receiving at least one ping reply packet across the network communication;

a ping validator coupled to the ping receiver for determining, based on an indication of a hardware characteristic or a concurrent process affecting the ping packet or the ping reply packet, whether each ping reply packet should be accepted or ignored; and a latency measurement device for measuring a transmission time of each accepted ping reply packet and determining a latency measurement of the network communication from the measured transmission times of accepted ping reply packets.

28. The system of claim 27, wherein each ping reply packet comprises a flag specifying whether the ping reply packet should be accepted or ignored.

29. The system of claim 27, wherein: each ping reply packet comprises a field specifying a delay factor, the delay factor corresponding to an elapsed time between receipt of a ping packet at a node and transmission of a corresponding ping reply packet from the node; and the latency measurement device adjusts the measured transmission time based on the specified delay factor.

* * * * *

UNITED STATES PATENT AND TRADEMARK OFFICE
CERTIFICATE OF CORRECTION

PATENT NO.: 6,061,722

DATED: May 9, 2000

INVENTORS: William J. Lipa, Howard L. Berkey and Derrick L. Pendleton

It is certified that error appears in the above-identified patent and that said Letters Patent is hereby corrected as shown below:

Column 12, line 5, replace "packer" with --packet--.

Column 12, line 22, replace "packer" with --packet--.

Column 12, line 50, replace "packer" with --packet--.

Column 12, line 51, replace "packer" with --packet--.

Signed and Sealed this

Twentieth Day of March, 2001

*Attest:*

NICHOLAS P. GODICI

*Attesting Officer*   *Acting Director of the United States Patent and Trademark Office*